United States Patent [19]

Kennedy

[11] 3,996,419
[45] Dec. 7, 1976

[54] TECHNIQUE FOR MINIMIZING MULTI-PATH DISTORTION EFFECTS IN VIDEO TRANSMISSION

[75] Inventor: Paul G. Kennedy, Monroeville, Pa.

[73] Assignee: Westinghouse Electric Corporation, Pittsburgh, Pa.

[22] Filed: May 27, 1975

[21] Appl. No.: 580,860

[52] U.S. Cl. .......................... 178/6; 178/DIG. 46; 325/62; 325/476; 358/8
[51] Int. Cl.$^2$ ......................................... H04N 5/21
[58] Field of Search ...................... 178/DIG. 44, 6; 358/167, 187, 8; 325/62, 476

[56] References Cited
UNITED STATES PATENTS

| | | | |
|---|---|---|---|
| 2,236,134 | 3/1941 | Gloess | 178/DIG. 44 |
| 2,310,692 | 2/1943 | Hansell | 178/DIG. 44 |
| 3,753,123 | 8/1973 | Carpenter | 325/476 |
| 3,860,952 | 1/1975 | Tallent | 358/8 |
| 3,935,536 | 1/1976 | Kimura | 325/476 |

*Primary Examiner*—Howard W. Britton
*Attorney, Agent, or Firm*—M. P. Lynch

[57] ABSTRACT

A reference signal reflecting distortion characteristics caused by surrounding interference conditions is applied to transmitted television video or quasi-video information to effectively cancel the distortion characteristics of the incoming transmitted video information. In the event the signal distortion results from randomly occurring interference such as "airplane flutter" the reference signal may be updated periodically such as during the vertical blanking of each and every incoming television frame. This regular and periodic updating of the reference signal will serve to compensate continuously for varying interference conditions as well as compensating for fixed interference patterns. In the event the interference causing signal distortion is the result of a fixed condition, it may not be necessary to update continuously the reference signal and thus a random or manually initiated update may be acceptable.

4 Claims, 3 Drawing Figures

TECHNIQUE FOR MINIMIZING MULTI-PATH DISTORTION EFFECTS IN VIDEO TRANSMISSION

BACKGROUND OF THE INVENTION

Information transmitted as video signals via video transmission equipment arrive at a receiving antenna by a variety of routes, some of which have significantly different path lengths than others. The varying path lengths of the incoming video information can result in a distorted video signal which, in the case of television reception, produces "ghosts". Typical interference and distortion results from reflections from airplanes, known as airplane flutter which tends to alter the path length of the incoming video signal. Examples of fixed causes of interference are buildings and structures in the vicinity of the receiving antenna. While such distortion in the incoming video signal is merely a nuisance which can be tolerated by a home television viewer, the occurrence of a few seconds of interference resulting from the presence of aircraft, can have significant adverse effect on transmitted video information which has a total duration of only a few seconds. An example of such a video transmission is described in detail in U.S. Pat. No. 3,789,137, Time Compression Of Audio Signals, issued Jan. 29, 1974 and assigned to the assignee of the present invention. The system disclosed in the above identified patent compresses many minutes of audio information into a few seconds of pseudo-video information for transmission by a conventional video apparatus for recording on video recording means and subsequent time expansion and conversion into conventional analog audio signals. In such a system, wherein typically a thirty minute audio program is transmitted as a few seconds of pseudo-video information, the occurrence of distortion or other interference for only those few seconds can have a significant adverse effect on the entire 30 minute program. While there are well-known techniques using tapped delay lines to compensate for fixed multi-path distortion, and while it is apparent that the use of elaborate sensing circuits coupled with automatic adjustment of tapped delays and gains can compensate for varying multi-path conditions, such techniques are both expensive and complex.

A technique is described herein which provides a relatively simple and inexpensive method reducing the distortion effects arising from the recurring synchronizing, blanking and code signals in multi-path conditions.

SUMMARY OF THE INVENTION

There is described herein with reference to the accompanying drawings a technique for developing and updating a reference signal which is typically applied through a summing circuit through which incoming video or quasi-video information is transmitted to improve the quality of the received information by reducing reflections of recurring parts of the waveform from those parts which are non-recurring.

DESCRIPTION OF THE DRAWINGS

The invention will become more readily apparent from the following exemplary description in connection with the accompanying drawings.

DESCRIPTION OF THE INVENTION

Figure 1:
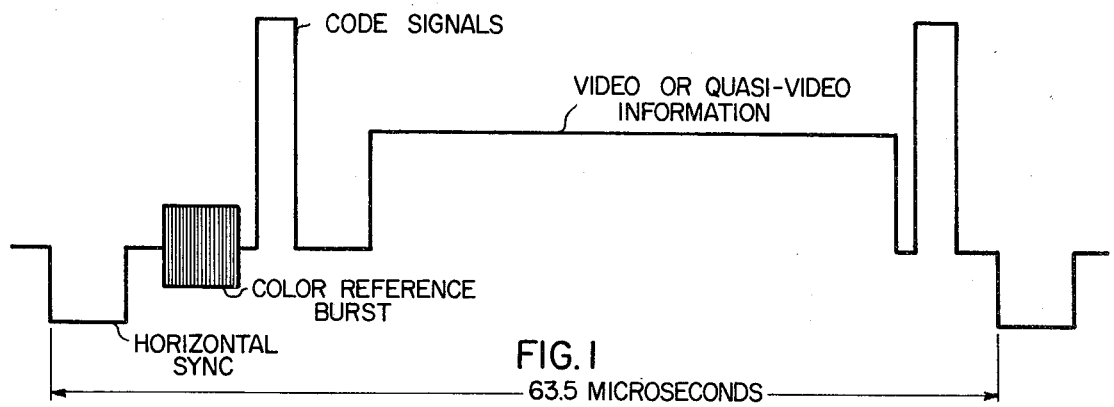
FIG. 1 is a waveform illustration of an undistorted video signal.
Figure 2:
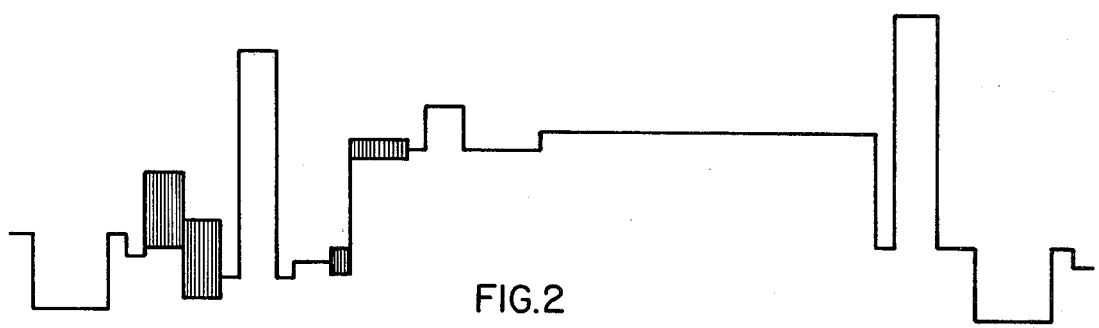
FIG. 2 is a waveform illustration of a video signal subject to distortion by multi-path conditions.

There is illustrated in FIG. 1 a waveform representation of a line of video information typically encountered in television systems. The television line as illustrated in FIG. 1 represents an ideal situation wherein no distortion or interference from ambient conditions is encountered. Generally, however, the transmission and reception of video information undergoes distortion resulting from interference with the transmission path produced by such things as surrounding buildings, overhead aircraft, etc. The effect on the video waveform is illustrated in FIG. 2.

Figure 3:
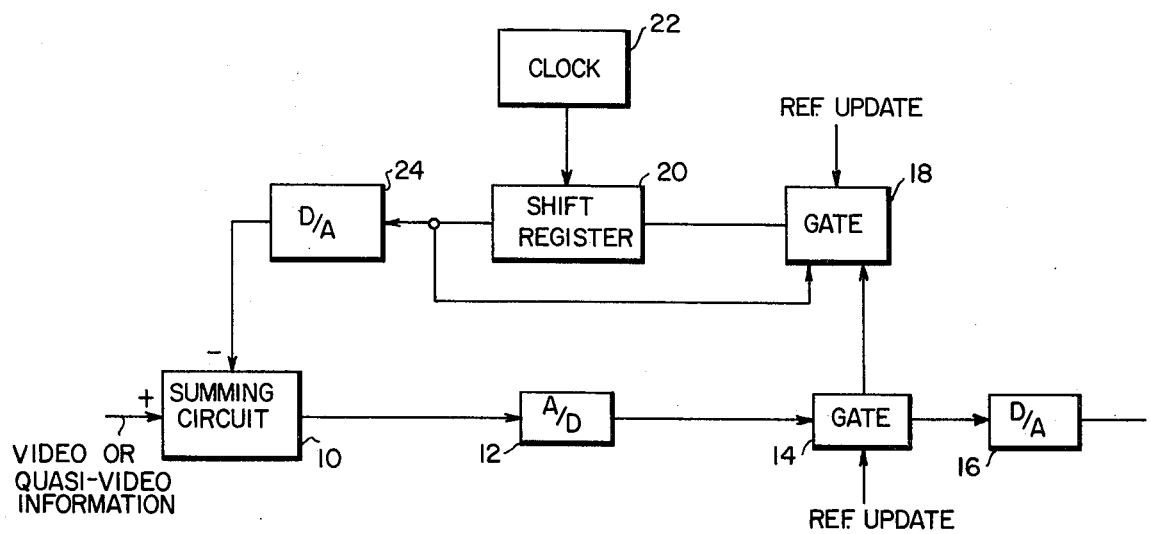
FIG. 3 is a schematic illustration of a basic embodiment of the invention.

Referring to FIG. 3 there is illustrated a basic block diagram schematic of a technique for substantially eliminating the distortion effects produced by multi-path conditions. Television information processed for recording and displaying on cathode ray tubes consists of television frames and fields which constitute the image displayed on the cathode ray tube. Assuming, for the purposes of discussion, that the information supplied to the summing circuit 10 of FIG. 3 is transmitted television information, such video information is converted from analog to digital format by the A/D converter 12 and subsequently applied as input signals to the gate circuit 14. In the absence of a gating input to the gate circuit 14, herein identified as a reference update input, the digital information is transmitted directly to the digital to analog converter 16 and reestablished as the original video information supplied to the summing circuit 10.

The operation of the circuit of FIG. 3 to provide compensation for signal distortion due to multi-path conditions is initiated by the application of a reference update signal to gate 14 which causes the video information output from the analog to digital converter 12 to be supplied to gate 18. The reference update signal can correspond with the vertical blanking interval of each field of transmitted video information and can be of a duration to supply one line of video information, i.e., such as that illustrated in FIGS. 1 and 2, which will serve as the reference signal, to the gate 18. The application of the reference update signal to the gate 18 causes the television line making up the reference signal to be transmitted to the shift register 20 which responds to clocking pulses from the clock circuit 22 to transmit the reference signal to the digital to analog converter 24. The output of the digital to analog converter is available to be supplied to the summing circuit 10 for summing with the received video information in a manner to cancel the distortion characteristics of the incoming video information. The clock signals supplied to the shift register 20 are adjusted to synchronize the reference signal supplied to the summing circuit 10 by the digital to analog converter 24 with the received video information. The output of the shift register 20 is applied in a recirculating, feedback loop through the gate 18 to continually refresh the shift register 20 and maintain the reference signal information available for compensating each line of incoming video information of the respective field. The occurrence of the vertical blanking interval of each successive television field causes a new reference signal to be gated through shift register 20 and digital to analog converter 24. In the event the multi-path conditions causing distortion in the received video information do not vary with time but rather represent relatively fixed conditions, the reference update signal need not occur at each field but rather at a less frequent rate and in fact can correspond to a randomly applied, manually initiated update signal. The concept of cancelling distortion characteristics of video information basically illustrated in FIG. 3 has a direct application to the processing of the time compressed audio information developed by the system disclosed in the above identified U.S. patent wherein audio information is converted into quasi-video for transmission and processing via conventional video apparatus.

In a system where the incoming video information is to be recorded on a disc recorder, it may be desirable to cancel the distortion characteristics prior to recording so as to reduce the dynamic range of the video signals and thus make optimum use of the dynamic range of the disc recorder.

What is claimed is:

1. A method for reducing the distortion characteristics of video bandwidth information transmitted in television line format, wherein the non-recurring program information comprises the active portion of the TV line and the recurring blanking, sync and code information comprises the inactive portion of the TV line, comprising the steps of, transmitting an initial TV line without said non-recurring video bandwidth information in said active portion of said initial TV line prior to transmission of a plurality of successive TV lines containing video bandwidth information in the active portions thereof, storing said initial TV line with the attendant distortion and reflections resulting from transmission interference with the recurring information contained in the inactive portion of said initial TV line, said stored initial TV line comprising a reference TV line, transmitting successive TV lines following said initial TV line, said successive TV lines containing non-recurring video bandwidth information in the active portions thereof, and recurring information in the inactive portions thereof, said successive TV lines comprising program information TV lines, and combining said reference TV line with each of said successively transmitted program TV lines to effectively minimize the distortion and reflection introduced in said successively transmitted program information TV lines resulting from transmission interference with the recurring information of said program information TV lines.

2. A method as claimed in claim 1 wherein said successive TV lines comprise a television field, and said initial TV line is transmitted during the vertical blanking interval.

3. A method as claimed in claim 2 including the step of updating the reference TV line by transmitting an initial TV line in the vertical blanking interval of each and every field of transmitted video bandwidth information, wherein said field of transmitted video bandwidth information comprises said successive TV lines.

4. A method for removing the recurring information corresponding to blanking, sync and code information present in the inactive portion of transmitted program information television lines wherein the program information present in the non-recurring active portion of the transmitted program information television lines consists of video bandwidth audio information to permit the processing of the audio information of the respective program information television lines without the recurring portion of the television lines, comprising the steps of, transmitting an initial TV line without said non-recurring video bandwidth audio information in said active portion of said TV line prior to transmission of a plurality of successive program information TV lines containing non-recurring video bandwidth audio information in the active portion thereof, storing said initial TV line with the attendant distortion and reflections resulting from transmission interference with the recurring information contained in the inactive portion of said initial TV line, said stored initial TV line comprising a reference TV line, transmitting successive program TV lines following said initial TV line, each containing recurring information in the inactive portion and non-recurring video bandwidth audio information in the recurring portion, and combining said reference TV line with each of said successive program information TV lines to effectively remove distortions and reflections resulting from transmission interference with the recurring information of said program information TV lines, and effectively removing the recurring information in said program information TV lines to permit processing of said video bandwidth audio information without the recurring information.

* * * * *